US012313252B1

(12) United States Patent
Yang

(10) Patent No.: US 12,313,252 B1
(45) Date of Patent: May 27, 2025

(54) WATERPROOF LAMP HEAD STRUCTURE

(71) Applicant: Dongguan City is THE Art of Optoelectronic Technology Co., Ltd., Dongguan (CN)

(72) Inventor: Fude Yang, Dongguan (CN)

(73) Assignee: Dongguan City is THE Art of Optoelectronic Technology Co., Ltd., Dongguan (CN)

( * ) Notice: Subject to any disclaimer, the term of this patent is extended or adjusted under 35 U.S.C. 154(b) by 0 days.

(21) Appl. No.: 18/895,788

(22) Filed: Sep. 25, 2024

(30) Foreign Application Priority Data

Sep. 13, 2024 (CN) ......................... 202422244135.4

(51) Int. Cl.

| | |
|---|---|
| ***F21V 31/00*** | (2006.01) |
| ***F21V 17/00*** | (2006.01) |
| ***F21V 17/12*** | (2006.01) |
| ***F21V 17/16*** | (2006.01) |
| ***F21V 19/00*** | (2006.01) |
| ***F21V 21/088*** | (2006.01) |
| ***F21V 23/00*** | (2015.01) |
| *F21Y 113/00* | (2016.01) |
| *F21Y 115/10* | (2016.01) |

(52) U.S. Cl.
CPC .......... *F21V 31/005* (2013.01); *F21V 17/005* (2013.01); *F21V 17/12* (2013.01); *F21V 17/164* (2013.01); *F21V 19/0045* (2013.01); *F21V 21/088* (2013.01); *F21V 23/002* (2013.01); *F21Y 2113/00* (2013.01); *F21Y 2115/10* (2016.08)

(58) Field of Classification Search
CPC ...... F21V 31/005; F21V 17/005; F21V 17/12; F21V 17/164; F21V 19/0045; F21V 21/088; F21V 23/002
See application file for complete search history.

(56) References Cited

U.S. PATENT DOCUMENTS

| | | | | |
|---|---|---|---|---|
| 12,044,365 | B1 * | 7/2024 | Zou | F21V 31/00 |
| 12,055,275 | B1 * | 8/2024 | Zou | F21S 4/10 |
| 12,098,832 | B1 * | 9/2024 | Wang | F21V 9/00 |
| 2024/0210025 | A1 * | 6/2024 | Wu | F21K 9/90 |
| 2024/0384842 | A1 * | 11/2024 | Zou | F21V 3/02 |
| 2024/0426437 | A1 * | 12/2024 | Wang | F21V 17/06 |
| 2025/0020316 | A1 * | 1/2025 | Lei | F21V 23/002 |
| 2025/0052410 | A1 * | 2/2025 | Yang | F21S 4/10 |

* cited by examiner

*Primary Examiner* — Christopher E Dunay
(74) *Attorney, Agent, or Firm* — Birchwood IP

(57) ABSTRACT

Disclosed is a waterproof lamp head structure, including a lampshade and a lamp cap, where a connecting portion is arranged at a bottom of the lampshade, a cavity is arranged inside the lamp cap, and the connecting portion is detachably connected to the cavity; a lamp holder is arranged between the lampshade and the lamp cap, the lamp holder includes a fixing base, a fixing post, and plugs, and the fixing base includes first and second end faces; a bottom surface of the connecting portion is tightly abutted against the first end face; a connecting seat is arranged inside the lamp cap, grooves corresponding to the plugs are formed inside the connecting seat, and a top surface of the connecting seat is abutted against the second end face; the lamp holder is provided with through holes, and the through holes are communicated with interiors of the lampshade and the grooves.

9 Claims, 9 Drawing Sheets

WATERPROOF LAMP HEAD STRUCTURE

CROSS-REFERENCE TO RELATED APPLICATIONS

The application claims priority to Chinese Patent Application No. 202422244135.4, filed on Sep. 13, 2024 which is hereby incorporated by reference in its entirety.

TECHNICAL FIELD

The present disclosure belongs to the field of lighting fixtures, and particularly relates to a waterproof lamp head structure.

BACKGROUND

A light string is popular among the public as a light source product for being used as decorative lighting or creating an atmosphere, and is commonly used for decorating both outdoor and indoor scenes. The light string is usually composed of a plurality of lamp heads that are connected in series or in parallel, and each of the lamp heads includes a lamp holder as a lamp body. In the prior art, a sealing ring is usually arranged between a peripheral wall of the lamp body and the lamp holder to achieve the purpose of sealing and waterproofing; however, the sealing ring is exposed to sunlight and rain for a long period of time and gradually degrades, resulting in a significant reduction in its waterproof performance. As a result, moisture enters the lamp holder and causes short circuit or damage to the lamp body. Therefore, there is an urgent need for a waterproof lamp head structure with both excellent waterproof performance and durability.

SUMMARY

(1) Technical Problem to be Solved

The present disclosure provides a waterproof lamp head structure, so as to solve the problems of unreasonable waterproof structure and poor waterproof performance of an outdoor lamp head in the prior art.

(2) Technical Solution

The present disclosure provides a waterproof lamp head structure, including a lampshade and a lamp cap, where a connecting portion is arranged at a bottom of the lampshade, a cavity is formed inside the lamp cap, and the connecting portion is detachably connected to the cavity; a lamp holder is further arranged between the lampshade and the lamp cap, where the lamp holder includes a fixing base, a fixing post, and plugs, the fixing base includes a first end face and a second end face, the fixing post is fixedly connected to the first end face, and the plugs are fixedly connected to the second end face; the fixing post passes through the connecting portion and extends into the lampshade, and a bottom surface of the connecting portion is tightly abutted and sealed against the first end face; a connecting seat is arranged inside the lamp cap, grooves corresponding to the plugs are formed inside the connecting seat, the plugs are plugged into the grooves, and a top surface of the connecting seat is tightly abutted and sealed against the second end face; and the lamp holder is further provided with through holes penetrating through the lamp holder, and the through holes are communicated with interiors of both the lampshade and the grooves.

Further, a diameter of the first end face is greater than a diameter of the bottom surface of the connecting portion, and a diameter of the second end face is greater than a diameter of the top surface of the connecting seat.

Further, external threads are formed on an outer peripheral wall of the connecting portion, and internal threads corresponding to the external threads are formed on an inner peripheral wall of the cavity, such that the lampshade is in threaded connection with the lamp cap.

Further, two through holes are formed on the lamp holder, two metal sheets are accordingly arranged in the grooves, and the metal sheets are respectively arranged in a one-to-one correspondence with the two through holes.

Further, a wire slot inwardly recessed is formed on a bottom of the lamp cap, a bottom of each of the metal sheets is provided with a sharp-angle structure, and the sharp-angle structures of the metal sheets pass through the bottom of the lamp cap and extend into the wire slot.

Further, a centrally arranged recessed portion is arranged at bottoms of the plugs, and a bump corresponding to the recessed portion is arranged in the grooves; and when the plugs are connected to the grooves, the bump is snapped into the recessed portion.

Further, a guide block is arranged on a side of an inner peripheral wall of the grooves, and a guide slot corresponding to the guide block is formed on a peripheral wall of each of the pins; and when the plugs are connected to the grooves, the guide block is arranged inside the guide slot.

Further, a lamp cover is further arranged at the bottom of the lamp cap, the lamp cover is provided with hooks extending towards a direction of the lamp cap, and slots corresponding to the hooks are formed at the bottom of the lamp cap; and a first protrusion is arranged corresponding to the wire slot on the lamp cap, a second protrusion corresponding to the first protrusion is arranged inside the wire slot, and the first protrusion and the second protrusion are both “W”-shaped protrusion structures.

Further, a side wall of the lamp cover is further provided with a fixing hook that extends toward a direction of a side wall of the lampshade.

Further, the lampshade is in a teardrop-shaped structure as a whole, a plurality of diamond-shaped portions are evenly distributed on a peripheral wall of the lampshade, and the diamond-shaped portions can be either protruding or recessed structure.

Compared with the prior art, the present disclosure has the following beneficial effects:

The lamp holder is arranged between the lampshade and the lamp cap, such that the connecting portion of the lampshade and the groove inside the lamp cap form a double-sided extrusion of the fixing seat in the lamp holder, thereby achieving a tight and waterproof connection between the lampshade and the groove, and the waterproofing and sealing performance of the lamp head are thus improved; in addition, the lamp head has a simple structure and can be detachably assembled, facilitating the assembly and efficiency of the lamp head.

Figure 1:
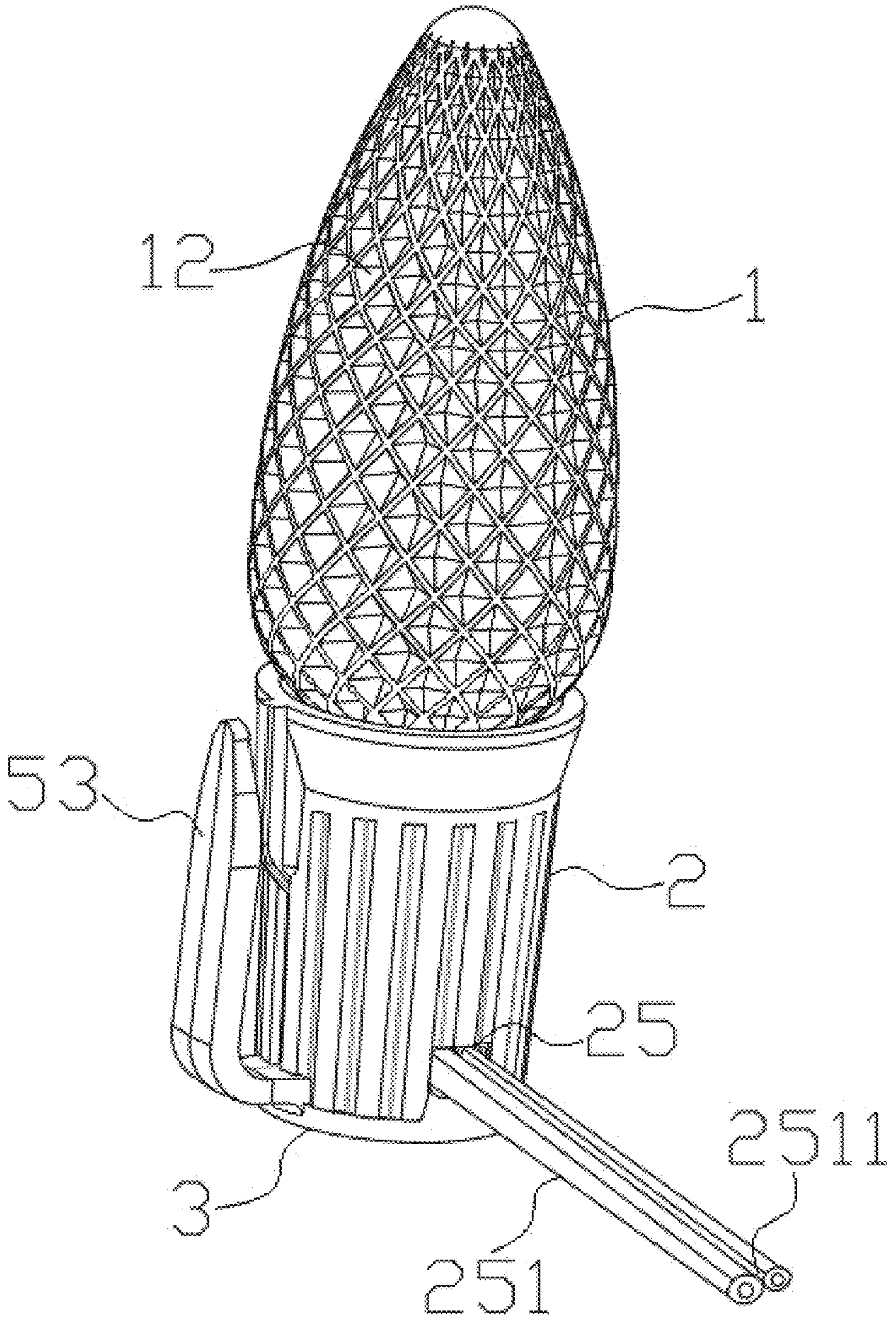
FIG. 1 is an overall structural schematic diagram according to the present disclosure.
Figure 2:
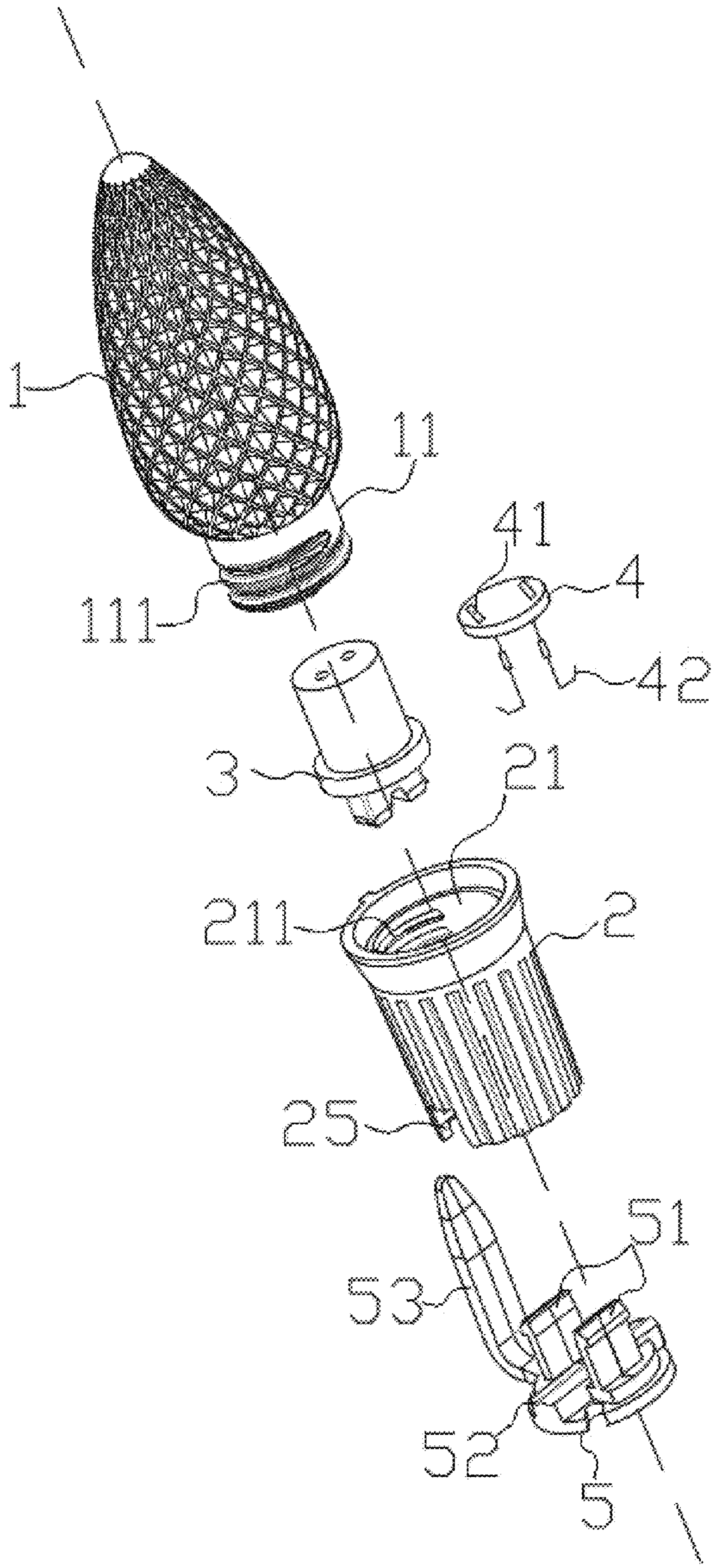
FIG. 2 is an overall exploded view according to the present disclosure.

Reference numerals in the accompanying drawings: 1. lampshade; 11. connecting portion; 111. external thread; 12. diamond-shaped portion; 2. lamp cap; 21. cavity; 211. internal thread; 22. connecting seat; 23. groove; 231. protrusion; 232. guide block; 24. metal sheet; 241. sharp-angle structure; 25. wire slot; 251. wire; 2511. connection slot; 252. second protrusion; 26. slot; 3. lamp holder; 31. fixing base; 311. first end face; 312. second end face; 32. fixing post; 33. plug; 331. recessed portion; 332. guide slot; 34. through hole; 4. circuit board; 41. lamp bead; 42. pin; 43. electronic assembly; 5. lamp cover; 51. hook; 52. first protrusion; and 53. fixing hook.

DESCRIPTION OF EMBODIMENTS

The technical solutions of embodiments of the present disclosure will be described below clearly and comprehensively in conjunction with accompanying drawings of the embodiments of the present disclosure.

Figure 3:
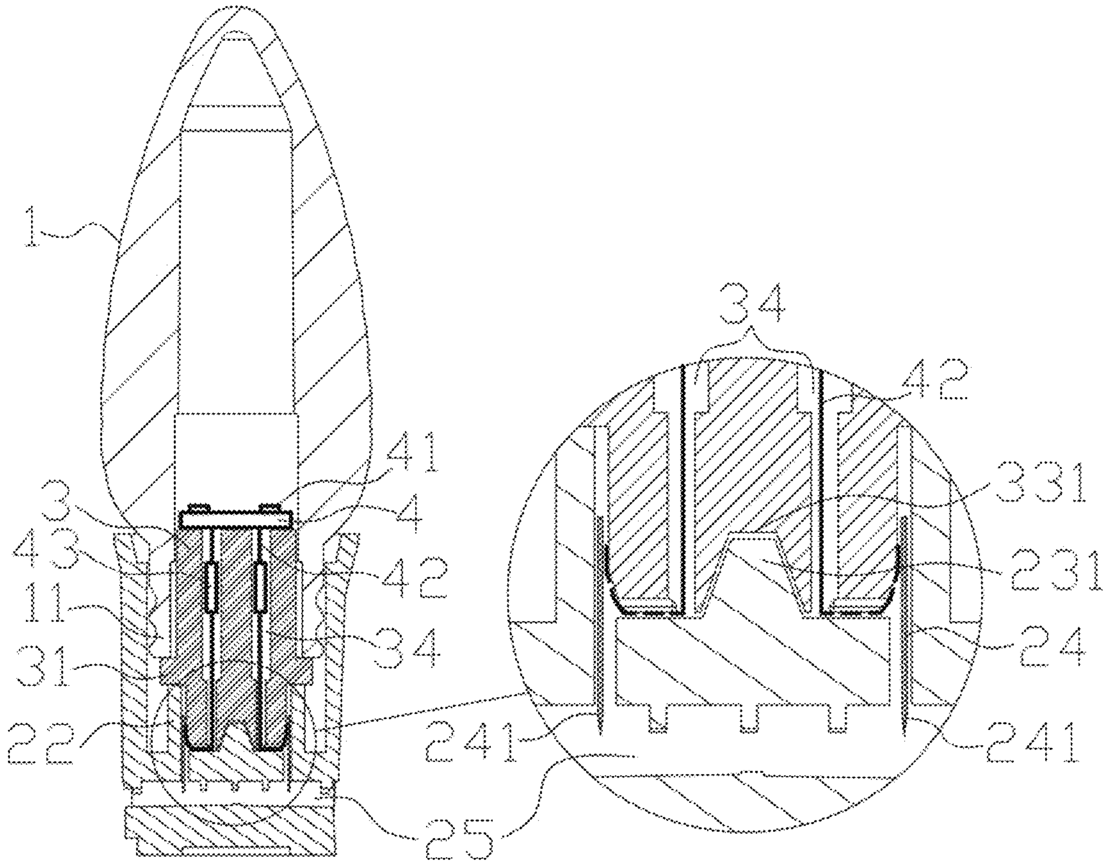
FIG. 3 is an overall sectional view according to the present disclosure.

As shown in FIGS. 1-9, the present disclosure provides a waterproof lamp head structure, including a lampshade 1 and a lamp cap 2, where a connecting portion 11 is arranged at a bottom of the lampshade 1, a cavity 21 is formed inside the lamp cap 2, and the connecting portion 11 is inserted into the cavity 21 to facilitate a detachable connection between the lampshade 1 and the lamp cap 2; a lamp holder 3 is further arranged between the lampshade 1 and the lamp cap 2, where the lamp holder 3 includes a fixing base 31, a fixing post 32, and plugs 33, the fixing base 31 includes a first end face 311 facing the lampshade 1 and a second end face 312 facing the lamp cap 2, the fixing post 32 is fixedly connected to the first end face 311, and the plugs 33 are fixedly connected to the second end face 312; and the lamp holder 3 is further provided with through holes 34 penetrating through the lamp holder 3, one end of each of the through holes 34 is communicated with a top surface of the fixing post 32, and the other end thereof is communicated with bottom surfaces of the plugs 33;

specifically, as shown in FIG. 3, a top of the fixing post 32 passes through the connecting portion 11 and extends into the lampshade 1, and a bottom surface of the connecting portion 11 is tightly abutted and sealed against the first end face 311 of the fixing base 31; a connecting seat 22 is arranged on a bottom wall inside the lamp cap 2, and grooves 23 corresponding to the plugs 33 are formed inside the connecting seat 22, the plugs 33 are arranged in the grooves 23, and a top surface of the connecting seat 22 is tightly abutted and sealed against the second end face 312 of the fixing base 31;

further, a diameter of the first end face 311 of the fixing base 31 is greater than a diameter of the bottom surface of the connecting portion 11, and a diameter of the second end face 312 is greater than a diameter of the top surface of the connecting seat 22; when the fixing base 31 is connected between the connecting portion 11 and the connecting seat 22, the first end face 311 and the second end face 312 of the fixing base 31 can be respectively abutted against and cover the bottom surface of the connecting portion 11 and the top surface of the connecting seat 22, such that sealing connection among the lampshade 1, the lamp holder 3, and the lamp cap 2 can be effectively improved;

when in use, a circuit board 4 with LED beads 41 is first fixed on the top surface of the fixing post 32, pins 42 on the circuit board 4 are passed through the through holes 34 and fixed to bottom and side surfaces of the plugs 33, and the plugs 33 are then inserted into the grooves 23 and electrically connected with metal sheets 24 arranged in the grooves 23; when the metal sheets 24 are connected to an external power source, the LED beads 41 are lighted via the pins 42 and the circuit board 4; and finally, the fixing post 32 and the LED beads 41 are passed through the connecting portion 11 and extended into the lampshade 1, and the lampshade 1 is then fixedly connected to the lamp cap 2 via the connecting portion 11, such that the overall installation of the lamp head is completed;

specifically, the through holes 34 are communicated with interiors of both the lampshade 1 and the grooves 23, and the first end face 311 and the second end face 312 of the fixing base 31 are tightly abutted against the connecting portion 11 and the connecting seat 22, respectively, such that the connection stability and waterproof sealing among the lampshade 1, the lamp holder 3, and the lamp cap 2 are improved; and in addition, the lamp head has a simple structure and is easy to disassemble and assemble, facilitating rapid assembly of the lamp head; and it should be noted that at least one electronic assembly 43 is further provided on the pins 42, the electronic assembly 43 is configured to regulate current and voltage of the circuit board 4; and preferably, the electronic assembly 43 can be a resistor or other electronic components.

Specifically, external threads 111 are formed on an outer peripheral wall of the connecting portion 11, and internal threads 211 corresponding to the external threads 111 are formed on an inner peripheral wall of the cavity 21 of the lamp cap 2, and a detachable connection between the connecting portion 11 and the lamp cap 2 is achieved through a threaded connection between the external threads 111 and the internal threads 211; and in addition, a user can rotate the lampshade 1 through the threaded connection between the connecting portion 11 and the lamp cap 2, such that the connecting portion 11 and the connecting seat 22 can simultaneously squeeze and clamp the fixing base 31, and it can be determined whether the lamp head has achieved waterproof sealing effects according to the rotation tension of the lampshade 1.

Figure 4:
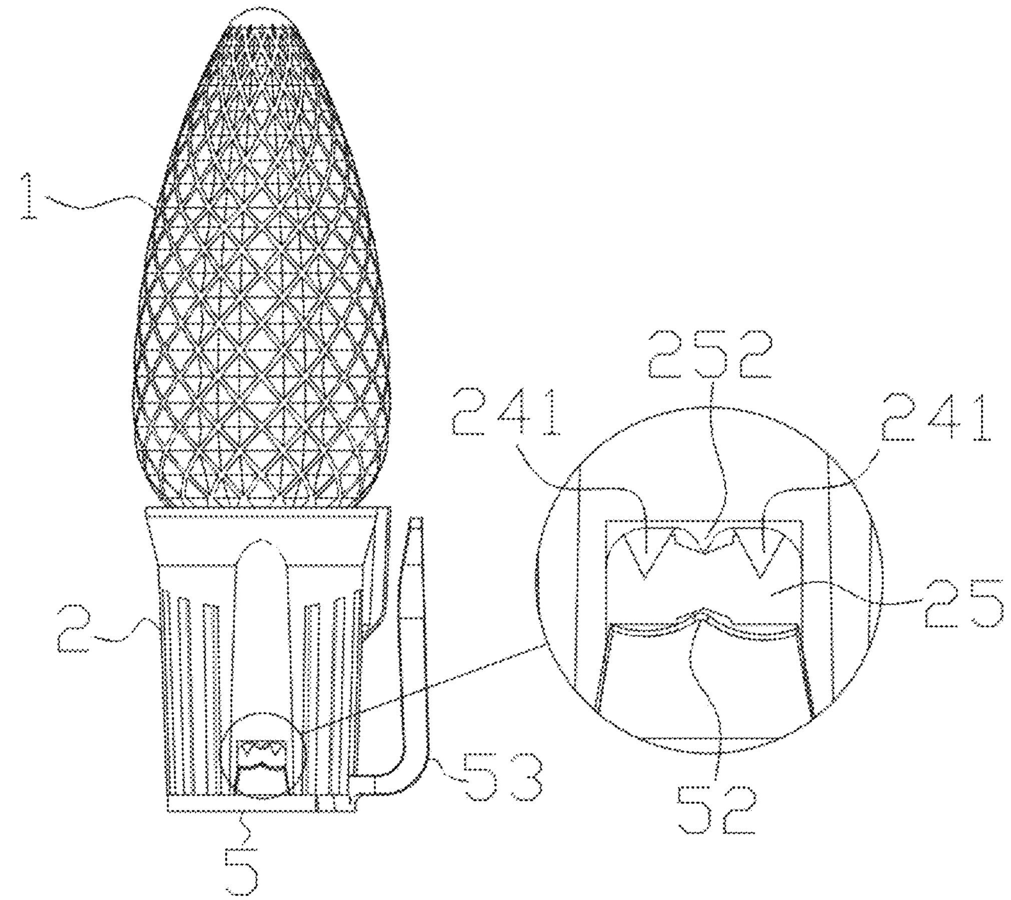
FIG. 4 is a front view according to the present disclosure.
Figure 5:
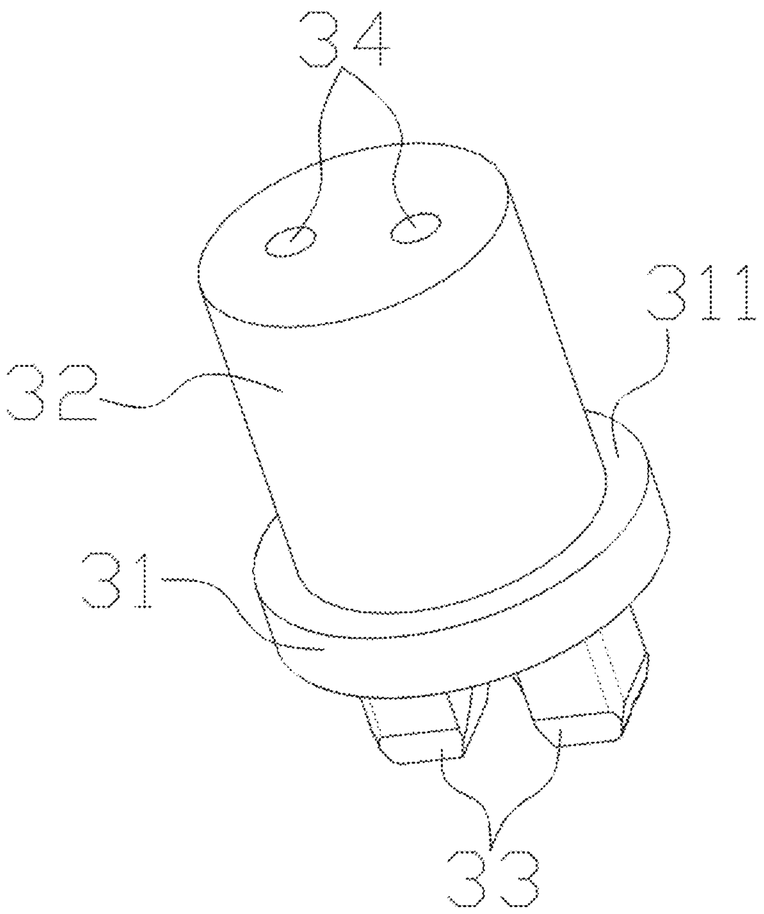
FIG. 5 is a first structural schematic diagram of a lamp holder according to the present disclosure.

Specifically, since the pins 42 on the circuit board 4 include positive and negative pins 42, two through holes 34 are formed on the lamp holder 3, two metal sheets 24 are accordingly arranged in the grooves 23, and the metal sheets 24 are respectively arranged in a one-to-one correspondence with the two through holes 34;

further, a wire slot 25 inwardly recessed is formed on a bottom of the lamp cap 2, two wires 251 in parallel are arranged inside the wire slot 25, one end of each of the metal sheets 24 is electrically connected to the pins 42, the other end thereof passes through the bottom of the lamp cap 2 and extends into the wire slot 25 to be electrically connected to the wires 251, and the two metal sheets 24 correspond to the two wires 251 one by one;

more further, as shown in FIG. 4, a bottom of each of the metal sheets 24 is provided with a sharp-angle structure 241; during assembly, the metal sheets 24 can pierce rubber sleeves (not shown) of the wires 251 in the wire slot 25 under the action of the sharp-angle structures 241, such that the metal sheets 24 are electrically connected to conductive wires (not shown) inside the wires 251; and by arranging the sharp-angle structures 241, it is unnecessary to manually strip the wires 251 when assembling the lamp head, thereby effectively saving assembly time and improving assembly efficiency; and preferably, in order to further improve the sealing between the lamp holder 3 and the connecting portion 11 and the connecting seat 22, the lamp holder 3 is preferably made from elastic sealing material, such that the fixing base 31 in the lamp holder 3 can be slightly deformed under the double-sided extrusion of the connecting portion 11 and the connecting seat 22, and the fit between the fixing base 31 and the connecting portion 11 and connecting seat 22 is improved, thereby improving the waterproof sealing of the lamp head.

Figure 6:
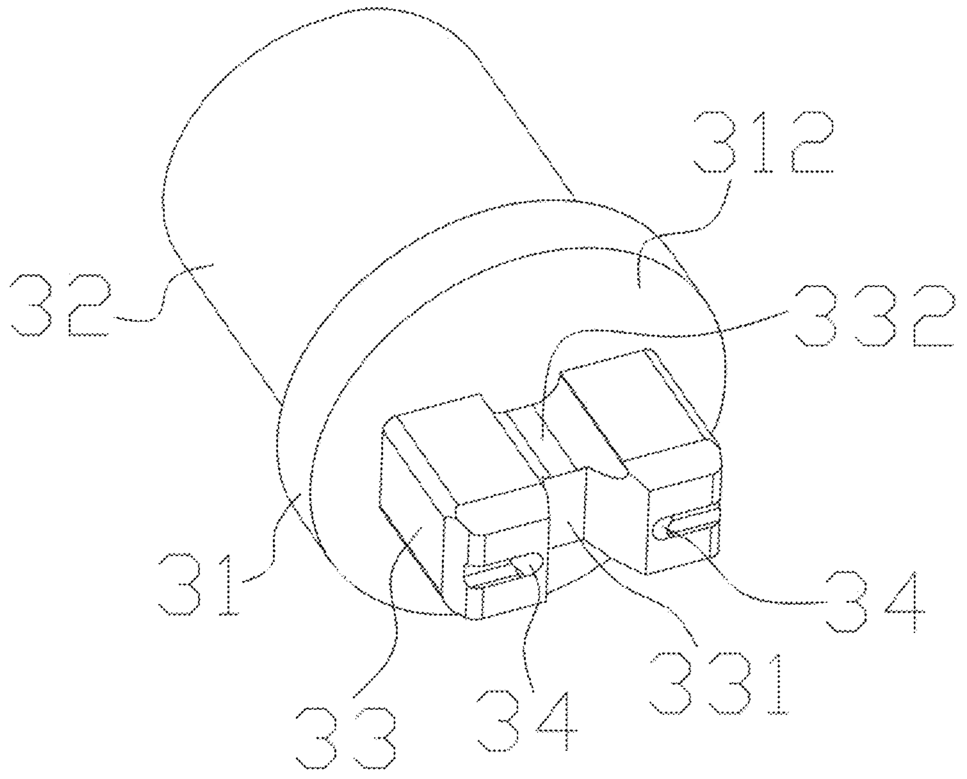
FIG. 6 is a second structural schematic diagram of a lamp holder according to the present disclosure.
Figure 7:
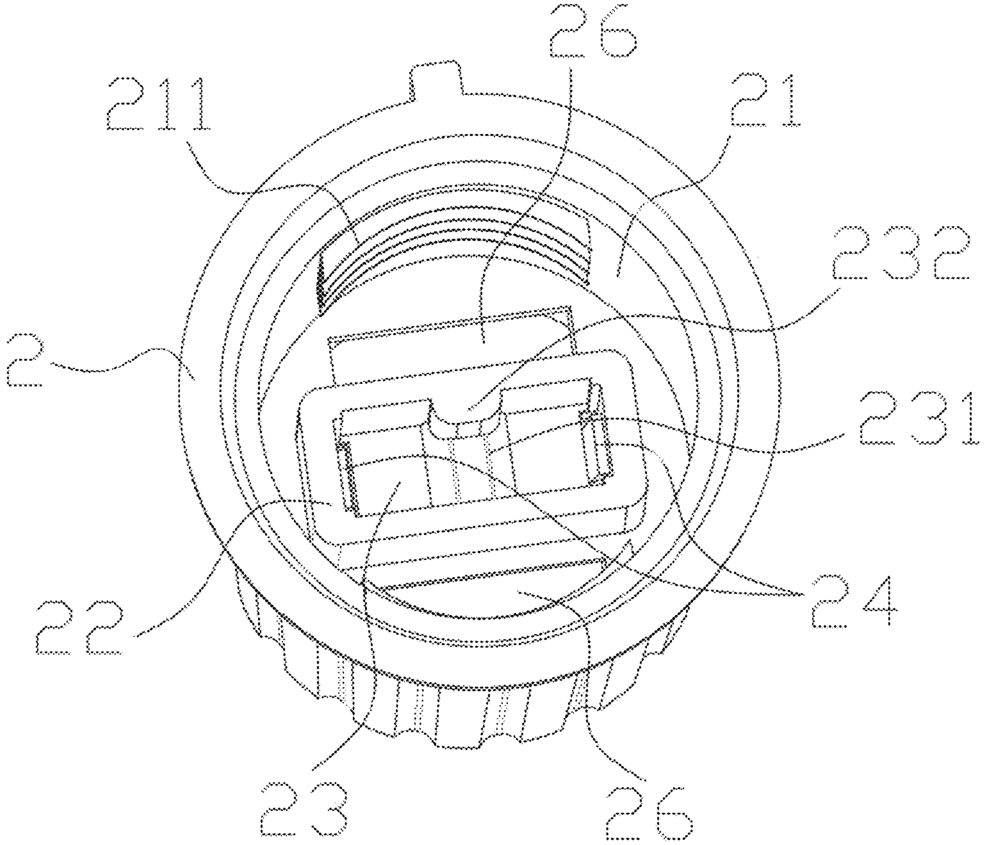
FIG. 7 is a first structural schematic diagram of a lamp cap according to the present disclosure.
Figure 8:
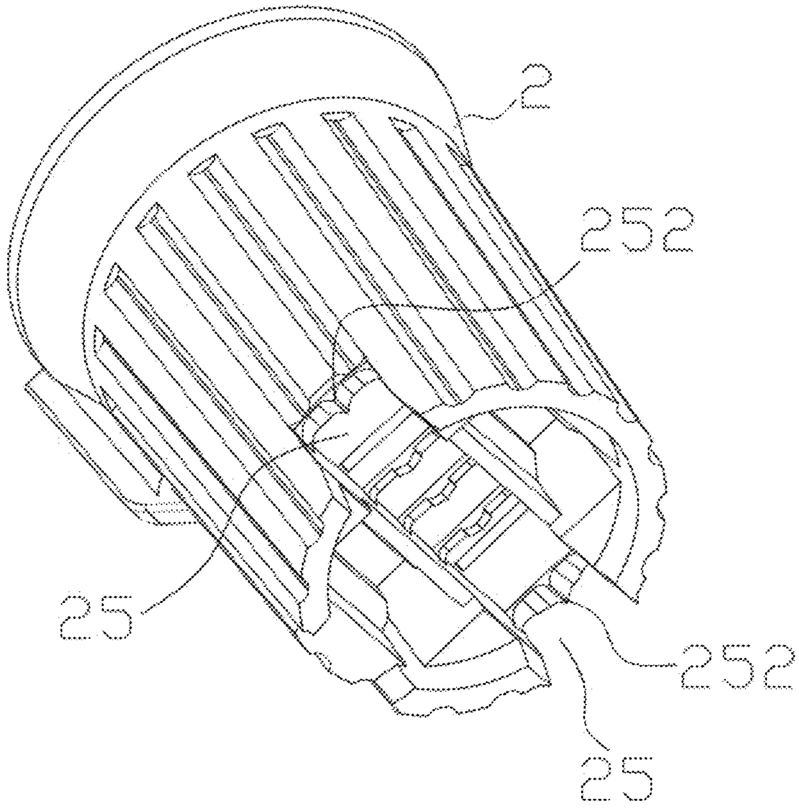
FIG. 8 is a second structural schematic diagram of a lamp cap according to the present disclosure.
Figure 9:
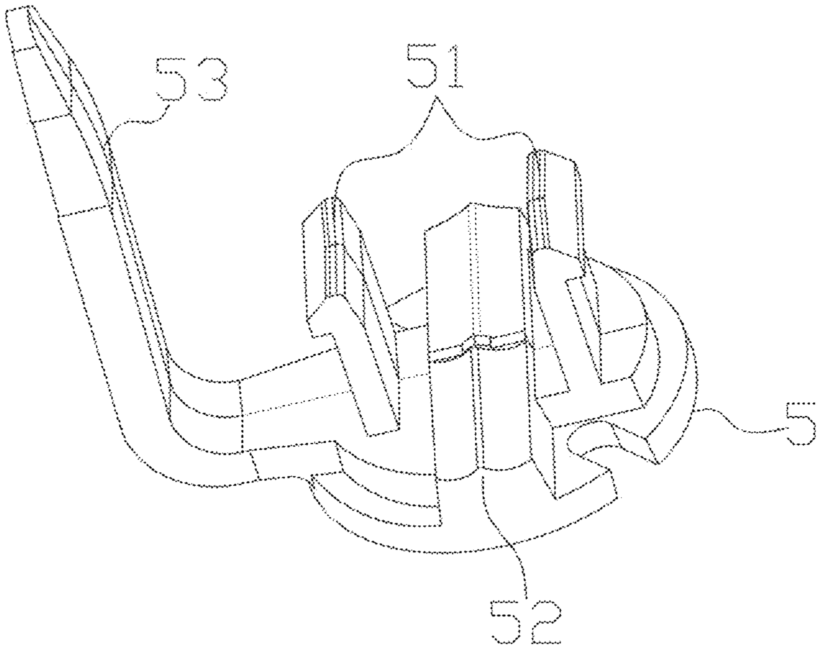
FIG. 9 is a structural schematic diagram of a lamp cover according to the present disclosure.

Specifically, as shown in FIGS. 6-7, a centrally arranged recessed portion 331 is arranged at bottoms of the plugs 33, and a bump 231 corresponding to the recessed portion 331 is arranged in the grooves 23; and when the plugs 33 are connected to the groove 23, the bump 231 is snapped into the recessed portion 331, the plugs 33 has a guiding effect when being connected to the grooves 23, and the assembly efficiency of the lamp head is accordingly improved;

further, since the pins 42 include the positive and negative pines, the pins 33 also have positive and negative side when they are connected to the grooves 23; a guide block 232 is arranged on a side of an inner peripheral wall of the grooves 23, a guide slot 332 corresponding to the guide block 232 is formed on a peripheral wall of each of the pins 33, and only when a position of the guide block 232 is aligned with the guide slot 332, the plugs 33 can be fixedly connected to the groove 23, therefore, the arrangement of the guide block 232 and the guide slot 332 can effective improve the accuracy of assembly between the lamp holder 3 and the lamp cap 2;

specifically, as shown in FIG. 7 or 9, a lamp cover 5 is further arranged at the bottom of the lamp cap 2, a top of the lamp cover 5 is provided with hooks 51 extending towards a direction of the lamp cap 2, and slots 26 corresponding to the hooks 51 are formed at the bottom of the lamp cap 2; and during installation, the lamp cover 5 and the lamp cap 2 are snapped into the slots 26 via the hooks 51, and the lamp cover 5 and the lamp cap 2 are detachably connected by introducing the hooks 51 and the slots 26, such that the structure is simple, and the assembly and disassembly are convenient, facilitating the repair and maintenance of the lamp head structure;

further, two slots 26 are arranged on the lamp cap 2, the two slots 26 are symmetrically arranged on both sides of the wire slot 25, and two hooks 51 are correspondingly arranged on the lamp cover 5, and are arranged in one-to-one correspondence with the slots 26;

more further, as shown in FIG. 4, a first protrusion 52 with a "W"-shaped structure is arranged on the lamp cover 5 and between the two hooks 51, the first protrusion 52 is arranged corresponding to the wire slot 25 on the lamp cap 2, a second protrusion 252 corresponding to the first protrusion 52 is arranged inside the wire slot 25, and the second protrusion 252 has the "W"-shaped structure extending towards a direction of the first protrusion 52; and in addition, a connection slot 2511 is formed between the two wires 251, when the wires 251 is arranged inside the wire slot 25, top and bottom surfaces of the wires 251 are abutted against the first protrusion 52 and the second protrusion 252, respectively, in which case, middle raised portions of the first protrusion 52 and the second protrusion 252 are snap-fitted with the connection slot 2511;

the arrangement of the first protrusion 52 and the second protrusion 252 effectively secures the two wires 251 inside the wire slot 25, thereby effectively preventing displacement or rotation of the two wires 251, which could cause poor contact between the metal sheets 24 and the wires 251, such that the stability of the electrical connection between the metal sheets 24 and the wires 251 is improved;

preferably, as shown in FIG. 1, the side wall of the lamp cover 5 is further provided with a fixing hook 53 that extends toward a direction of a side wall of the lampshade 1; when in use, the fixing hook 53 can be used to fix the lamp head with a fixed object such as an outdoor tree branch, a fixed pole, or a fixed line, thereby enhancing the compatibility of the lamp head for use in a more installation scenarios; and specifically, the lampshade 1 is in a teardrop-shaped structure as a whole, a plurality of diamond-shaped portions 12 are evenly distributed on a peripheral wall of the lampshade 1, the diamond-shaped portions 12 are in diamond shapes, and in addition, the diamond-shaped portions 12 can be either protruding or recessed structure, and the arrangement of the diamond-shaped portions 12 enables the lampshade 1 to scatter light from inside, such that the lighting effects and brightness of the lamp head are improved.

Working principle of the present disclosure will be described in detail below:

during assembly, the circuit board 4 with LED beads 41 is first fixed on the top surface of the fixing post 32, the pins 42 on the circuit board 4 are passed through the through holes 34 and fixed to the bottom and side surfaces of the plugs 33, the lamp holder 3 is inserted and fixed inside the cavity 21 of the lamp cap 2 through the plugs 33 and grooves 23, and the pins 42 are then electrically connected with metal sheets 24 arranged in the grooves 23; the connecting portion 11 of the lampshade 1 is then sleeved over the fixing post 32, the lampshade 1 and the lamp cap 2 are secured by rotating the lampshade 1, in which case, the first end face 311 of the fixing base 31 is tightly abutted against the connecting portion 11, and the second end face 312 is tightly abutted against the connecting seat 22; and finally, the wires 251 is arranged inside the wire slot 25, and are snapped into the lamp cap 2 via the lamp cover 5, such that the wires 251 are squeezed towards the metal sheets 24, and under the action of the sharp-angle structures 241 of the metal sheets 24, the conductive wires of the wires 251 are electrically connected to the metal sheets 24, such that the overall assembly of the lamp head is completed.

The present disclosure has an inventive step that the lamp holder is arranged between the lampshade and the lamp cap, such that the connecting portion of the lampshade and the groove inside the lamp cap form a double-sided extrusion of the fixing seat in the lamp holder, thereby achieving a tight and waterproof connection between the lampshade and the groove, and the waterproofing and sealing performance of the lamp head are thus improved; in addition, the lamp head has a simple structure and can be detachably assembled, facilitating the assembly and efficiency of the lamp head.

Furthermore, it should be understood that although the description is described according to implementations, each implementation does not include only one independent technical solution, the description is for clarity only, and those skilled in the art should take the description as a whole, the technical solutions in the various embodiments may be appropriately combined to form other implementations understandable by those skilled in the art.

For those skilled in the art, it is apparent that the present disclosure is not limited to details of the exemplary embodiments, and the present disclosure can be implemented in other specific forms without departing from the spirit or basic features of the present disclosure. Therefore, the embodiments should be regarded as illustrative and non-restrictive no matter from which point of view. The scope of the present disclosure is defined by the appended claims rather than the above specification, and therefore, it is intended that all changes which fall within the meaning and scope of equivalency of the claims are embraced in the present disclosure. Any reference numerals in the claims should not be construed as limiting the claims to which they relate.

What is claimed is:

1. A waterproof lamp head structure, comprising a lampshade and a lamp cap, wherein a connecting portion is arranged at a bottom of the lampshade, a cavity is formed inside the lamp cap, and the connecting portion is detachably connected to the cavity;

a lamp holder is further arranged between the lampshade and the lamp cap, wherein the lamp holder comprises a fixing base, a fixing post, and plugs, the fixing base comprises a first end face and a second end face, the fixing post is fixedly connected to the first end face, and the plugs are fixedly connected to the second end face; and the fixing post passes through the connecting portion and extends into the lampshade, and a bottom surface of the connecting portion is tightly abutted and sealed against the first end face; a connecting seat is arranged inside the lamp cap, grooves corresponding to the plugs are formed inside the connecting seat, the plugs are plugged into the grooves, and a top surface of the connecting seat is tightly abutted and sealed against the second end face; and the lamp holder is further provided with through holes penetrating through the lamp holder, and the through holes are communicated with interiors of both the lampshade and the grooves;

wherein a centrally arranged recessed portion is arranged at bottoms of the plugs, and a bump corresponding to the recessed portion is arranged in the grooves; when the plugs are connected to the grooves, the bump is snapped into the recessed portion.

2. The waterproof lamp head structure according to claim 1, wherein a diameter of the first end face is greater than a diameter of the bottom surface of the connecting portion, and a diameter of the second end face is greater than a diameter of the top surface of the connecting seat.

3. The waterproof lamp head structure according to claim 2, wherein external threads are formed on an outer peripheral wall of the connecting portion, and internal threads corresponding to the external threads are formed on an inner peripheral wall of the cavity, such that the lampshade is in threaded connection with the lamp cap.

4. The waterproof lamp head structure according to claim 3, wherein two through holes are formed on the lamp holder, two metal sheets are accordingly arranged in the grooves, and the metal sheets are respectively arranged in a one-to-one correspondence with the two through holes.

5. The waterproof lamp head structure according to claim 4, wherein a wire slot inwardly recessed is formed on a bottom of the lamp cap, a bottom of each of the metal sheets is provided with a sharp-angle structure, and the sharp-angle structures of the metal sheets pass through the bottom of the lamp cap and extend into the wire slot.

6. The waterproof lamp head structure according to claim 5, wherein a lamp cover is further arranged at the bottom of the lamp cap, the lamp cover is provided with hooks extending towards a direction of the lamp cap, and slots corresponding to the hooks are formed at the bottom of the lamp cap; and a first protrusion is arranged corresponding to the wire slot on the lamp cap, a second protrusion corresponding to the first protrusion is arranged inside the wire slot, and the first protrusion and the second protrusion are both W-shaped protrusion structures.

7. The waterproof lamp head structure according to claim 6, wherein a side wall of the lamp cover is further provided with a fixing hook that extends toward a direction of a side wall of the lampshade.

8. The waterproof lamp head structure according to claim 1, wherein a guide block is arranged on a side of an inner peripheral wall of the grooves, and a guide slot corresponding to the guide block is formed on a peripheral wall of each of the plugs; and when the plugs are connected to the grooves, the guide block is arranged inside the guide slot.

9. The waterproof lamp head structure according to claim 1, wherein the lampshade is in a teardrop-shaped structure as a whole, a plurality of diamond-shaped portions are evenly distributed on a peripheral wall of the lampshade, and the diamond-shaped portions are protruding or recessed structures.

* * * * *